United States Patent
Stoler

(10) Patent No.: US 10,623,446 B1
(45) Date of Patent: Apr. 14, 2020

(54) MULTI-FACTOR AUTHENTICATION FOR APPLICATIONS AND VIRTUAL INSTANCE IDENTITIES

(71) Applicant: CyberArk Software Ltd., Petach-Tikva (IL)

(72) Inventor: Nimrod Stoler, Zoran (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 16/564,068

(22) Filed: Sep. 9, 2019

(51) Int. Cl.
*H04L 29/06* (2006.01)

(52) U.S. Cl.
CPC ........ *H04L 63/205* (2013.01); *H04L 63/0263* (2013.01); *H04L 63/083* (2013.01); *H04L 63/0823* (2013.01); *H04L 63/101* (2013.01)

(58) Field of Classification Search
CPC . H04L 63/205; H04L 63/083; H04L 63/0263; H04L 63/101; H04L 63/0823
See application file for complete search history.

(56) References Cited

U.S. PATENT DOCUMENTS

| | | | | |
|---|---|---|---|---|
| 8,959,650 | B1* | 2/2015 | Richards | G06F 21/44 709/227 |
| 2014/0189808 | A1* | 7/2014 | Mahaffey | H04L 63/083 726/4 |
| 2014/0304808 | A1* | 10/2014 | Martini | G06F 21/44 726/19 |
| 2016/0323280 | A1* | 11/2016 | Sade | H04L 63/10 |
| 2017/0041146 | A1* | 2/2017 | Davis | H04L 9/3247 |

\* cited by examiner

*Primary Examiner* — Chau Le
(74) *Attorney, Agent, or Firm* — Finnegan, Henderson, Farabow, Garrett & Dunner LLP

(57) ABSTRACT

Disclosed embodiments relate to systems and methods for implementing secure and multi-factor authentication for computing resources. Techniques include accessing at least one portion of identity data for a computing resource; providing the at least one portion of the identity data to the computing resource; identifying network address information unique to the computing resource; identifying a request, from the computing resource, to perform an action requiring an access token; provisioning the network address information unique to the computing resource, for use in transmitting the access token to the computing resource; and verifying both the at least one portion of the identity data and the network address information unique to the computing resource.

20 Claims, 10 Drawing Sheets

300C

300E

MULTI-FACTOR AUTHENTICATION FOR APPLICATIONS AND VIRTUAL INSTANCE IDENTITIES

BACKGROUND

In recent years, multi-factor authentication for human users of computers has increased in popularity. Part of the impetus for multi-factor authentication is that single-factor authentication (e.g., based on a password, by itself) is vulnerable to attacks. For example, through use of malware (e.g., keylogging software), data breaches, and brute force attacks, this type of authentication is relatively easy to defeat by committed attackers. In an effort to achieve stronger security, multi-factor authentication involves two or more forms of authentication credentials of different types. For example, one form of authentication may be based on something the user knows (e.g., a password) while another form of authentication may be based on something the user has (e.g., a valid numerical code sent to the user's smartphone). In combination, these two forms of authentication may be used to restrict access to sensitive resources. The result is a level of authentication confidence higher than single-factor authentication can deliver.

Multi-factor authentication, however, has been uniquely designed for authentication of human users. No comparable or similarly effective techniques have been developed for authenticating software-based services themselves. Indeed, human-focused authentication techniques do not translate to the world of application-based and machine-based identities. Currently, when such services (e.g., network-based applications, virtual machines, container instances, etc.) engage in secure communications, they utilize an embedded privileged identity token or credential that was initially given to them at instantiation. This is a form of single-factor authentication, and one that is particularly vulnerable to attacks. If attackers are able to steal the embedded privileged identity token or credential, they can impersonate the software-based service and potentially cause widespread network compromise. Further, in addition to malicious attacks, existing forms of software-based service authentication are vulnerable to oversights and accidents. For example, if the code for a software-based service is leaked, or made available publicly (e.g., via GitHub™, Google Developers™, etc.), the embedded privileges or credentials may become known to unauthorized users.

In view of these and other deficiencies in existing techniques, technological solutions are needed for deploying secure and efficient forms of multi-factor authentication for software-based services (e.g., applications, application-based machines, etc.). According to such techniques, even if embedded privileges or credentials from an application or virtual instance or stolen or leaked, they will be powerless to perform a successful authentication. Instead, the application or virtual instance should be required to successfully undergo multi-factor authentication in a manner suitable for a software-based service environment. As described below, the techniques for multi-factor authentication should advantageously be designed for a software-based service environment, should be efficient (e.g., with minimal or no service interruption or downtime), should be flexible (e.g., capable of changing as network parameters and compositions change), and should be scalable (e.g., to support growing or shrinking numbers of applications or instances).

SUMMARY

Some disclosed embodiments describe non-transitory computer readable media, systems, and methods for implementing secure and multi-factor authentication for computing resources. For example, in an exemplary embodiment, there may be a non-transitory computer readable medium including instructions that, when executed by at least one processor, cause the at least one processor to perform operations for implementing secure and multi-factor authentication for computing resources. The operations may comprise accessing at least one portion of identity data for a computing resource; providing the at least one portion of the identity data to the computing resource; identifying network address information unique to the computing resource; identifying a request, from the computing resource, to perform an action requiring an access token; provisioning the network address information unique to the computing resource, for use in transmitting the access token to the computing resource; and verifying both the at least one portion of the identity data and the network address information unique to the computing resource; wherein only the computing resource is configured to assert its identity data and receive at the provisioned network address the access token.

According to a disclosed embodiment, the identity data comprises the network address information unique to the computing resource and at least one of: a certificate, a token, a password, or a secret.

According to a disclosed embodiment, the network address information unique to the computing resource includes an IP address and a port number associated with the computing resource.

According to a disclosed embodiment, the port number is dynamically assigned to the computing resource.

According to a disclosed embodiment, the network address information unique to the computing resource is obtained from a network router or firewall associated with the computing resource.

According to a disclosed embodiment, the operations further comprise, conditional on the verification being successful, providing a privileged credential to the computing resource.

According to a disclosed embodiment, the computing resource is at least one of: a virtual computing instance or an application.

According to a disclosed embodiment, provisioning the network address information includes transmitting the network address information to a network router or firewall associated with the computing resource.

According to a disclosed embodiment, provisioning the network address information occurs transparently to the computing resource.

According to a disclosed embodiment, the at least one portion of the identity data and the network address information are each, by themselves, insufficient to successfully perform the verification.

According to another disclosed embodiment, there may be a computer-implemented method for implementing secure and multi-factor authentication for computing resources. The method may comprise accessing at least one portion of identity data for a computing resource; providing the at least one portion of the identity data to the computing resource; identifying network address information unique to the computing resource; identifying a request, from the computing resource, to perform an action requiring an access token; provisioning the network address information unique to the computing resource, for use in transmitting the access token to the computing resource; and verifying both the at least one portion of the identity data and the network address information unique to the computing resource;

wherein only the computing resource is configured to assert its identity data and receive at the provisioned network address the access token.

According to a disclosed embodiment, the providing of the at least one portion of the identity data occurs during an initialization phase for the computing resource.

According to a disclosed embodiment, the providing of the at least one portion of the identity data occurs in response to the request from the computing resource.

According to a disclosed embodiment, identifying the request from the computing resource includes intercepting the request.

According to a disclosed embodiment, identifying the request from the computing resource includes receiving a re-routed version of the request.

According to a disclosed embodiment, the method further comprises, conditional on the verification being successful, providing a privileged credential to the computing resource.

According to a disclosed embodiment, the privileged credential is supplied from a credentials vault.

According to a disclosed embodiment, the privileged credential is sufficient to enable the computing resource to engage in secure communications with an access-restricted resource.

According to a disclosed embodiment, the network address information is obtained from a network router or firewall associated with the computing resource.

According to a disclosed embodiment, provisioning the network address information occurs transparently to the computing resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for secure and multi-factor authentication for computing resources, as addressed herein, overcome several important technical problems in the fields of data communications security, authentication, virtualized or cloud-based computing, and authorization to access secure resources. In contrast to current techniques, which allow for applications or virtual instances to authenticate themselves via hardcoded credentials (e.g., embedded passwords, tokens, or certificates), the techniques discussed below allow for elevated security while maintaining efficient and flexible operations. In accordance with the techniques discussed below, applications or virtual instances may be verified in terms of both identity data that they assert and inherent network address information that they are assigned. Through a combined verification of these two different types of data, the application or virtual instance may be verified in terms of varying attributes, which enhances security. Accordingly, if the identity data of a legitimate application or virtual instance is stolen or leaked, the identity data will not, by itself, be sufficient to verify the entity asserting it. Correspondingly, if an unauthorized application or user attempts to mimic or utilize the network address information of a legitimate application or virtual instance, that information will also be insufficient to validate the unauthorized application or user. In some embodiments, moreover, these techniques for multi-factor verification of a computing resource may occur transparently to the computing resource itself, and to the target resource it is seeking to access.

Reference will now be made in detail to the disclosed embodiments, examples of which are illustrated in the accompanying drawings.

Figure 1:
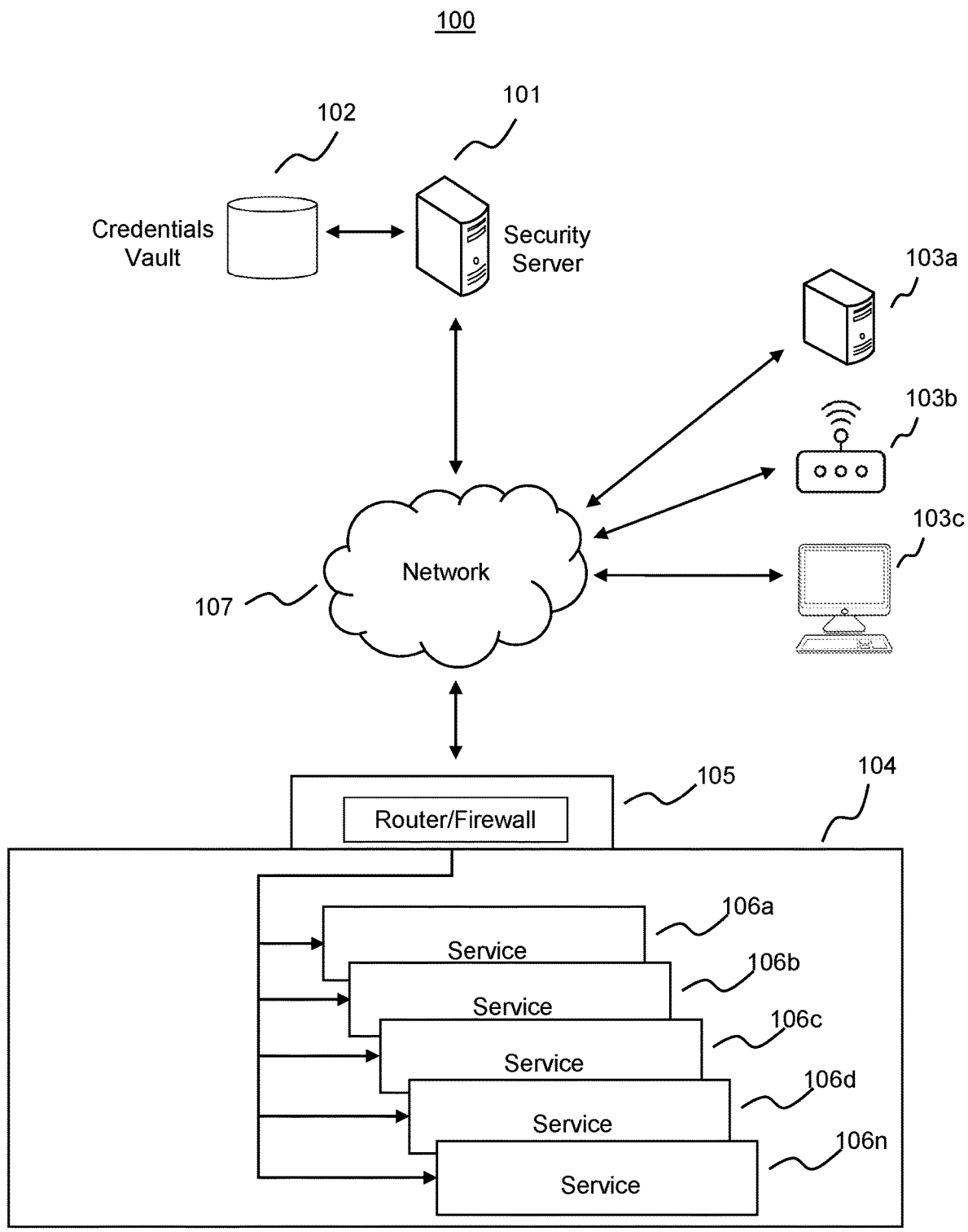
FIG. 1 is a block diagram of an exemplary system for implementing secure and multi-factor authentication for computing resources in an on-premises network, in accordance with disclosed embodiments.

FIG. 1 illustrates an exemplary system 100 for implementing secure and multi-factor authentication for computing resources. In accordance with system 100, one or more software-based services 106a-n may be initiated or already running in an on-premises computing environment 104. Before the resources 106a-n are verified and able to perform certain secure functionality (e.g., communicate with access-restricted target resources 103a-c, or with each other), they may undergo a multi-factor verification process. For example, as discussed below, software-based services 106a-n may assert a portion of identity data (e.g., a certificate or other data they have been provisioned) to security server 101. In addition, network address information inherently associated with software-based services 106a-n may be received at security server 101. Conditional on a verification of both the identity data and the network address information, resources 106a-n may be verified. In some embodiments, upon a successful verification, a credential may be retrieved from credentials vault 102, which may be used by or on behalf of resources 106a-n for authentication and secure access to access-restricted target resources 103a-c. The credential may be transmitted to the network address information (e.g., IP address and port number) associated with the validated identity data, which ensures that a malicious entity who has stolen the identity data cannot receive the credential. Because such a malicious entity would not have the same network address information, it would not receive the credential. These aspects of FIG. 1 and further discussed below.

Security server 101 may be implemented in a variety of configurations. In some embodiments, security server 101 may be a server within on-premises network 104. For example, security server 101 may be an administrator server or a special-purpose server configured to perform the operations described below in connection with FIGS. 3A-3G and 4. Further, in some embodiments security server 101 may be separate from on-premises network 104. In such embodiments, security server 101 may be operated by a third-party service provider and hosted in a separate on-premises or cloud-based (i.e., virtualized) network. In these various implementations, security server 101 may include hardware-based memory storing instructions configured to perform the functionality of FIGS. 3A-3G and 4.

For example, security server 101 may include one or more hardware-based processors, such as microprocessors, embedded processors, or the like, or may take the form of a system-on-a-chip (SoC). According to some embodiments, the processor may be from the family of processors manufactured by Intel®, AMD®, Qualcomm®, Apple®, NVIDIA®, or the like. Further, the processor may also be based on the ARM architecture, or may be a graphics processing unit, etc. The disclosed embodiments are not limited to any particular type of processor configured in security server 101. In addition, security server 101 may include one or more network adapter, such as network interfaces or communication devices (e.g., Ethernet, cellular, WiFi, Bluetooth®, RFID, NFC, RF, infrared, etc.) to communicate with the other components of FIG. 1 (e.g., resources 106a-106n, through router or firewall 105, or credentials vault 102, etc.).

Security server 101 may also include one or more hardware-based memories, such as storage devices or media configured to store instructions used by the processor(s) to perform the functions described below. The memory may be configured to store software instructions, such as programs that, when executed by the processor, perform the operations described in connection with FIGS. 3A-3G and 4. The disclosed embodiments are not limited to particular software types or devices configured to perform dedicated tasks. For example, the memory may store a single program, such as a user-level application, that performs the functions of the disclosed embodiments, or may comprise multiple software programs. Additionally, the processor may in some embodiments execute one or more programs (or portions thereof). Furthermore, the memory may include one or more storage devices or media configured to store data for use by the programs.

In some embodiments, security server 101 may be configured to access a credentials vault 102. Credentials vault 102 may be a network resource configured to store credentials (e.g., passwords, hashes based on passwords, tokens, cryptographic keys, certificates, secrets, or other data) that may be asserted to achieve authenticated access to secure (e.g., password-protected) network resources. In some embodiments, for example, credentials vault 102 may be a CyberArk™ vault. Credentials vault 102 may include integrated security techniques, such as periodic or automatic rotation of credentials stored within, monitoring capabilities regarding usage of credentials, detection and alerting capabilities to identify instances of misuse of credentials, and least-privilege policies that limit credentials to the lowest level of privileged access needed to perform defined privileged tasks (i.e., no excess or unnecessary privileges granted).

In some embodiments, credentials vault 102 may be internal to security server 101 (e.g., an internal database), where the two are an integrated single machine or system. Further, credentials vault 102 may be external to security server 101 but part of the same network as security server 101, or may be in a separate network (e.g., an isolated and secure network). Consistent with the embodiments below, when one of services 106a-n is successfully verified by security server 101, credentials vault 102 may provision a credential or access token in several ways. One such technique may be to provide the credential or token to the verified service 106a-n itself. Alternatively, for enhanced security, credentials vault 102 may provision the credential on behalf of the service 106a-n but without providing the credential to the service 106a-n. For example, the credentials vault 102 may provide the credential to security server 101 for assertion on behalf of service 106a-n, or may provide the credential directly to the access-protected target resource being accessed by the service 106a-n. As discussed further below, the credential may provide secure and authenticated access to a resource such as a server 103a (e.g., application server, web server, data server, etc.), IoT device 103b (e.g., network-connected sensor device, surveillance device, vehicle device, appliance, telephony equipment, power grid device, etc.), or computer 103c (e.g., personal computer, laptop, smartphone, smart watch, smart clothing, smart jewelry, etc.). Consistent with the embodiments below, such target devices 103a-c may have authentication requirements that may be satisfied based on security server 101 verifying a particular software-based service 106a-n and/or credentials vault 102 supplying a credential to be used in the authentication.

Security server 101, credentials vault 102, and target devices 103a-c may communicate with each other, and with on-premises network 104, through network 107. Network 107 may be various types of data communication networks that can carry data communications between the components of system 100. For example, network 107 may be based on any type of computer networking arrangement used to exchange data, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile network, a private data network, a virtual private network using a public network, a nearfield communications technique (e.g., Bluetooth™, infrared, etc.) that enables the system 100 to send and receive information between the components in the system 100. In some embodiments, network 107 may include two or more of these forms of communications. As an example, on-premises network 104 may communicate with security server 101 over a LAN or WAN, while services 106a-n may communicate with target devices 103a-c over a WAN or cellular network (e.g., 4G/5G, etc.).

On-premises network 104 may be implemented in a variety of embodiments. For example, on-premises network 104 may be a corporate or business network, educational institution network, IoT network, or various other types of networks. In such embodiments, on-premises network 104 may be implemented as a local area network (LAN), wireless local area network (WLAN), campus area network (CAN), etc., or a combination of these. On-premises network 104 may include a router or firewall 105. For example, if router/firewall 105 is a router, it may handle network traffic management for the various services 106a-n within network 104, such as by IP address, MAC address, and/or port number. For example, such a router may perform packet switching among these components. Further, if router/firewall 105 is a firewall, it may implement security policies to protect services 106a-c from outside threats. For example, such a firewall may implement whitelists and/or blacklists of IP addresses, URLs, URIs, etc., as well as behavioral or analytical security policies based on the timing, contents, addressing attributes, and other parameters of communications. In some embodiments, as discussed below, router/firewall 105 is configured to perform port forwarding, where it may receive incoming communications addressed to a particular service 106a-c (e.g., by port number) and route the communications to the service. Such port forwarding may be performed by a firewall, router, or other network device (e.g., gateway, switch, etc.). In some embodiments, router/firewall 105 may be an integrated device, performing both routing and firewall functionality.

Software-based services 106a-c within on-premises network 104 may be a variety of different types of software applications, agents, IoT devices, or other network-addressable devices. For example, services 106a-c may be applications or agents running on computers, servers, mobile devices, personal or wearable devices, etc. Further, services 106a-c may be IoT devices (e.g., network-connected utility equipment, sensors, vehicles, clothing, telephony devices, appliances, etc.). In some embodiments, services 106a-c may each be a different instance of the same application or device (e.g., each running the same software, perhaps with identical configuration settings), while in other embodiments services 106a-c may run different applications, perhaps on different types of devices.

Figure 2:
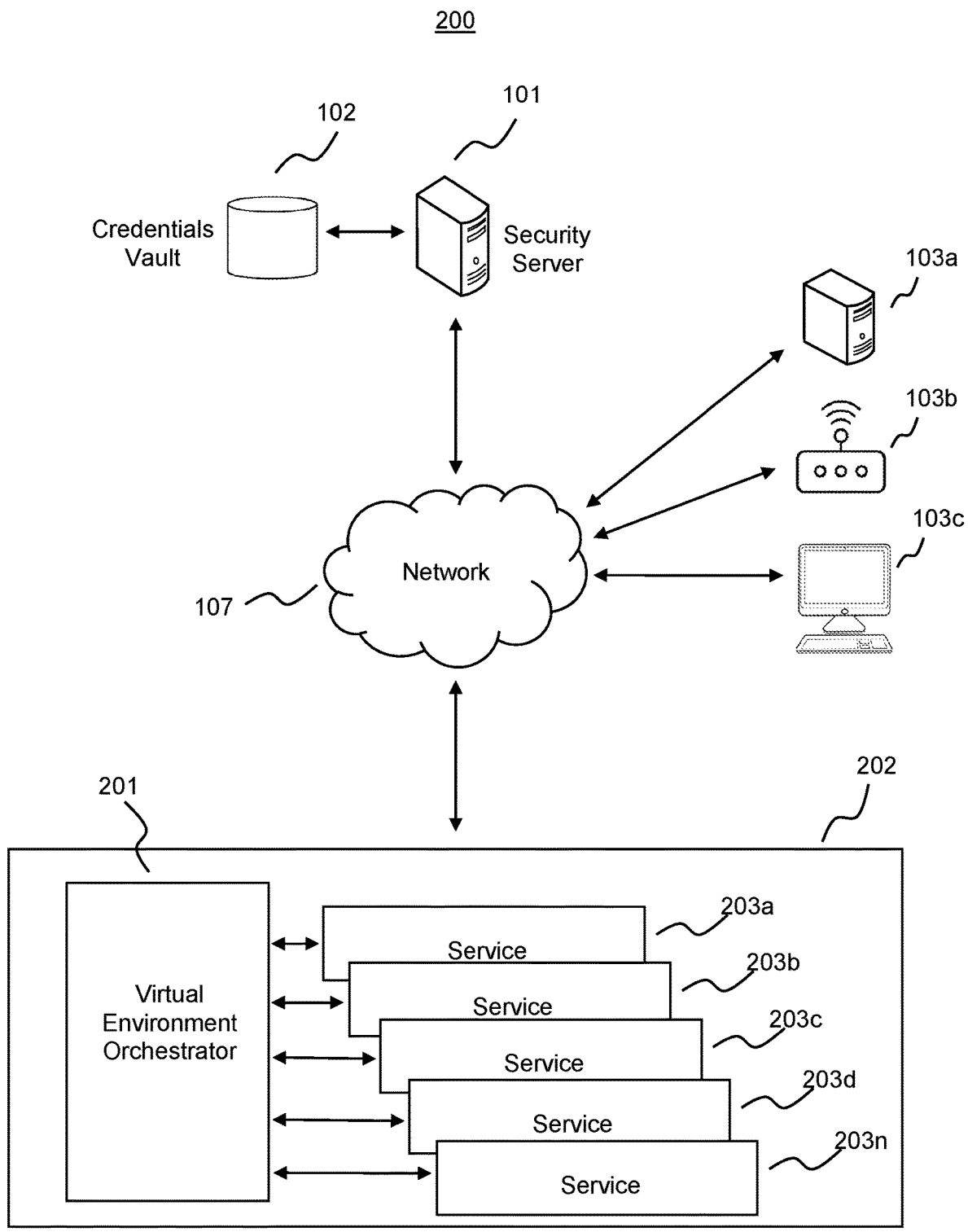
FIG. 2 is a block diagram of an exemplary system for implementing secure and multi-factor authentication for computing resources in virtual computing network, in accordance with disclosed embodiments.

FIG. 2 is a block diagram of an exemplary system 200 for implementing secure and multi-factor authentication for computing resources in a virtual computing network. In many respects, system 200 is similar to system 100. For example, both systems may include one or more security servers 101, credentials vaults 102, and target devices 103a-c. Unlike the on-premises network 104, however, virtual network 202 may be a cloud-based network comprising multiple virtualized computing instances 203a-n. For example, virtualized network 202 may be based on cloud platform software such as AWS™, Azure™, IBM Cloud™ VMware™ Google Cloud Platform™ or others. As such, virtualized computing instances 203a-n may be software-based services or other types of computing instances such as virtual machines, container instances (e.g., Docker™, Kubernetes™ Java™ containers, etc.), serverless code instances (e.g., AWS Lambda™), etc.

In accordance with FIG. 2, virtualized network 202 may include, or may be controlled by, a cloud environment orchestrator 201. In system 200, cloud environment orchestrator 201 may perform a variety of functions relating to the virtual instances 203a-n. For example, cloud environment orchestrator 201 may instantiate or spin up instances 203a-n, configure the parameters and settings of instances 203a-n, provision IP address or port number network address information for instances 203a-n, monitor the operations and communications activity of instances 203a-n, and deactivate or wind down instances 203a-n, among other functions. In various embodiments, virtual environment orchestrator 201 may be based on cloud platform tools such as OpenStack™, IBM Cloud Orchestrator™, Apache CloudStack™, Puppet™, AWS CloudFormation™, Chef™, and others. In some embodiments, virtual instances 203a-n may be developed, spun up, and operated in a DevOps (e.g., continuous development or continuous deployment) environment, such as an environment using Jenkins™, Docker™, Puppet™, Kubernetes™, Chef™, OpenShift™, etc. In various embodiments, virtual instances 203a-n may be copies of the same instance (e.g., based on a common image, and created through a scaling function by virtual environment orchestrator 201), or may each be different.

While FIGS. 1 and 2 illustrate different environments including, respectively, on-premises network 104 and virtualized network 202, in some embodiments the techniques described below in connection with FIGS. 3A-3G and 4 may be practiced in a combination of both types of networks. Such embodiments may be hybrids of cloud-based and on-premises networks. For example, such embodiments may include both on-premises application services 106a-n and virtualized instances 203a-n.

Figure 3A:
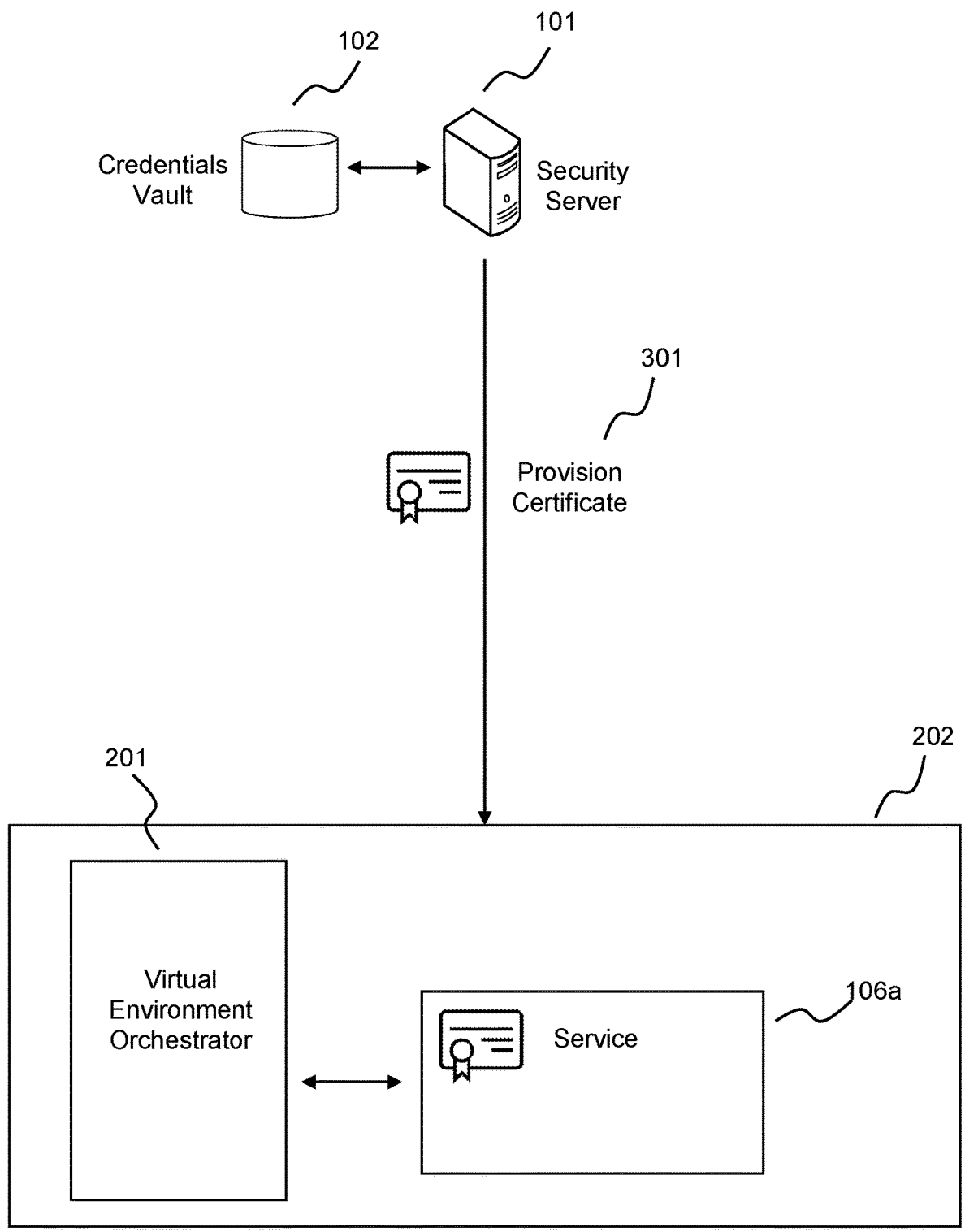
FIG. 3A is an illustration of an exemplary technique for provisioning a portion of identity data to a computing resource, in accordance with disclosed embodiments.

FIG. 3A illustrates an exemplary technique for provisioning a portion of identity data to a computing resource. In FIG. 3A, system 300A includes a subset of the components of FIGS. 1 and 2, solely for ease of illustration. In practice, system 300A may include additional components, fewer components, or alternative components. With respect to FIGS. 3A-3G, while they are illustrated as virtualized (e.g., cloud-based) environments in accordance with FIG. 2, the techniques may be practiced in on-premises networks as well, consistent with FIG. 1.

In accordance with system 300A, a first portion of identity data may be provided to a particular software-based service 106a in an operation 301. The identity data may be one or more of several different types of identifying data. For example, in some embodiments the identity data may be a user account name or identifier (e.g., Microsoft™, Linux, or other account name or identifier), an application account name or identifier, a digital certificate (e.g., SSL certificate, X.509 certificate, etc.), a token containing unique data, or other types of identifying data. Consistent with the embodiments below, the identity data may be provisioned for the service 106a from the security server 101 or from the credentials vault 102. Further, the identity data may be provisioned by virtual environment orchestrator 201 in some embodiments.

Operation 301 may occur in a variety of ways. For example, in some embodiments service 106a may be provisioned with the identity data as part of an instantiation or spinning up process of service 106a. This may involve, for example, virtual environment orchestrator 201 creating service 106a, or identifying the creation of service 106a by a separate resource (e.g., a DevOps pipeline resource). Further, in some embodiments service 106a may already be running in virtualized network 202, and may later be provisioned with identity data in operation 301. For example, virtual environment orchestrator 201 may be configured to scan existing virtualized instances in network 202, and determine that newly identified service 106a should receive identity data. Further, this may involve an identification of service 106a being configured to need access to a remote target resource that is access protected (e.g., service 106a is hardcoded with a URL or IP address of an external target resource requiring authentication). Further, in some embodiments an organization responsible for instantiating service 106a may report the deployment of service 106a in network 202 (e.g., report to security server 101 or virtual environment orchestrator 201), and in response to the report the identity data may be provisioned in operation 301.

Once computing resource 106a has received the identity data in operation 301, it may store the identity data. For example, if computing resource 106a is a virtual machine or container instance, it may store the identity data in a hard disk or in a memory accessible to it in its virtualized environment.

Figure 3B:
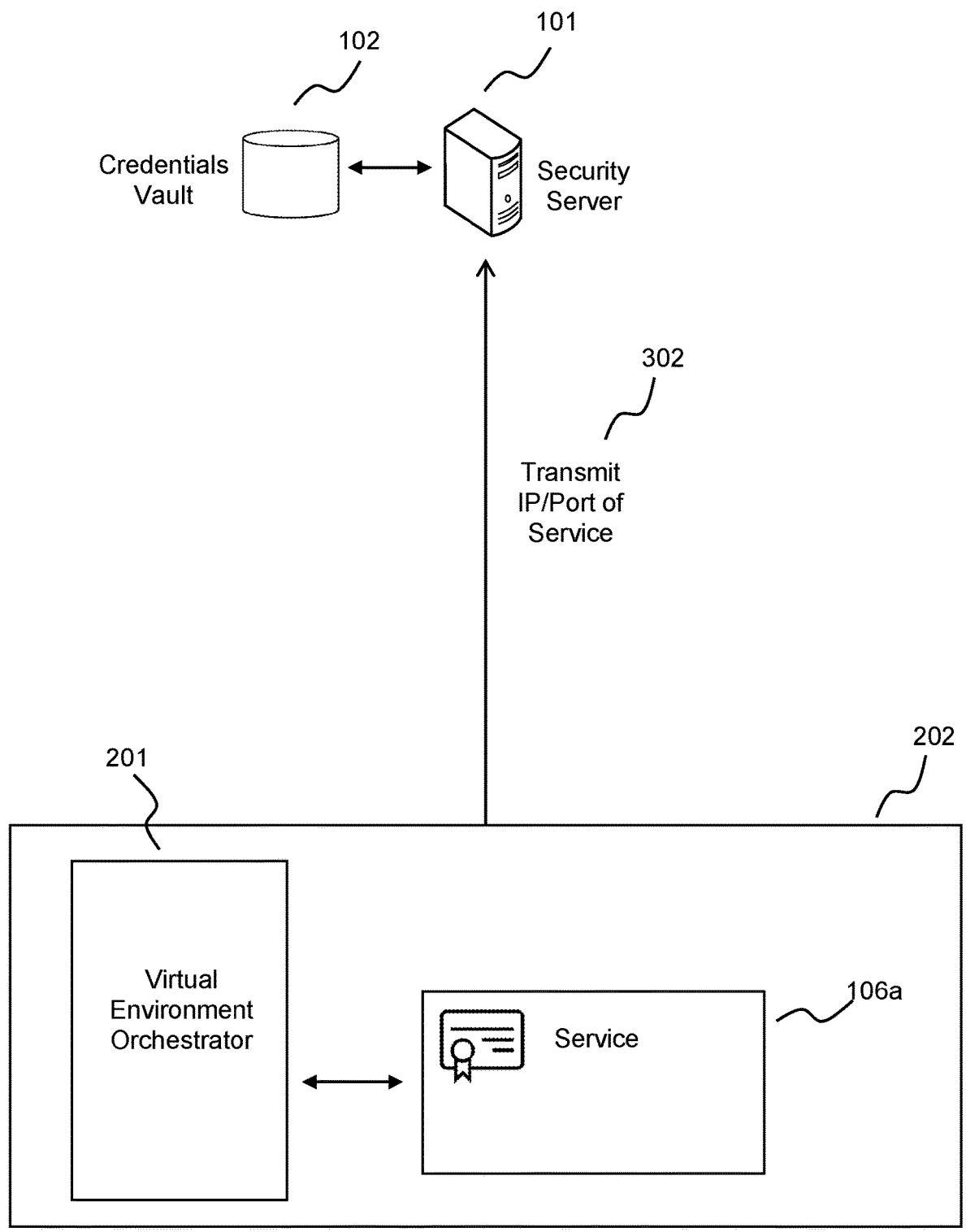
FIG. 3B is an illustration of an exemplary technique for identifying network address information associated with a computing resource, in accordance with disclosed embodiments.

FIG. 3B illustrates an exemplary system 300B for identifying network address information associated with a computing resource 106a, in accordance with disclosed embodiments. For example, in operation 302 of FIG. 3B, network address information assigned to computing resource 106a may be transmitted to security server 101 or to credentials vault 102. This may happen in several ways. In some embodiments, where virtual environment orchestrator 201 provisions the IP address and port number for computing resource 106a, it may automatically report that network address information to security server 101 or credentials vault 102 upon the instantiation of computing resource 106a or later, after the instantiation (e.g., when computing resource 106a seeks to access an external access-protected resource). In other embodiments, virtual environment orchestrator 201 may not provision the network address information for computing resource 106a, but may receive a report or notification of that network address information, or may detect the network address information during a scan of virtual environment 202. Further, in some embodiments, computing resource 106a may itself report its network address information (e.g., IP address and port number) to security server 101 or credentials vault 102. Computing resource 106a may do this automatically when it is first instantiated. Further, computing resource 106a may do this after it is already running (e.g., when it seeks to access an access-protected target resource).

In some embodiments, such as those involving a router/firewall 105 as discussed in connection with FIG. 1, operation 302 may include the router/firewall 105 sending the network address information (e.g., IP address and port number) to security server 101 or credentials vault 102. For example, router/firewall 105 may be configured to automatically, or upon request, transmit such network address information to security server 101 or credentials vault 102.

Once security server 101 (or credentials vault 102) has received the identity data (e.g., certificate as received in operation 301) and network address data (e.g., IP address and port number, in operation 302) of a particular computing resource 106a, it may create or update a table, list, or database. For example, the table, list, or database may maintain profiles for individual computing resources 106a-n, each indicating a corresponding element of identity data from operation 301, and network address information from operation 302. Consistent with the above embodiments, this table, list, or database may be updated automatically upon receiving reports from virtual environment orchestrator 201 of newly instantiated, or newly identified, virtual instances in environment 202. Similarly, the table, list, or database may be updated automatically based on router/firewall 105 forwarding network address information and identity data corresponding to individual computing resources 106a-n.

Figure 3C:
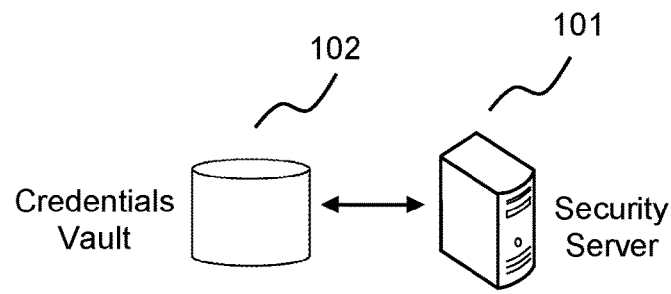
FIG. 3C is an illustration of an exemplary technique for a computing resource requesting to perform a privileged action, in accordance with disclosed embodiments.
Figure 3C:
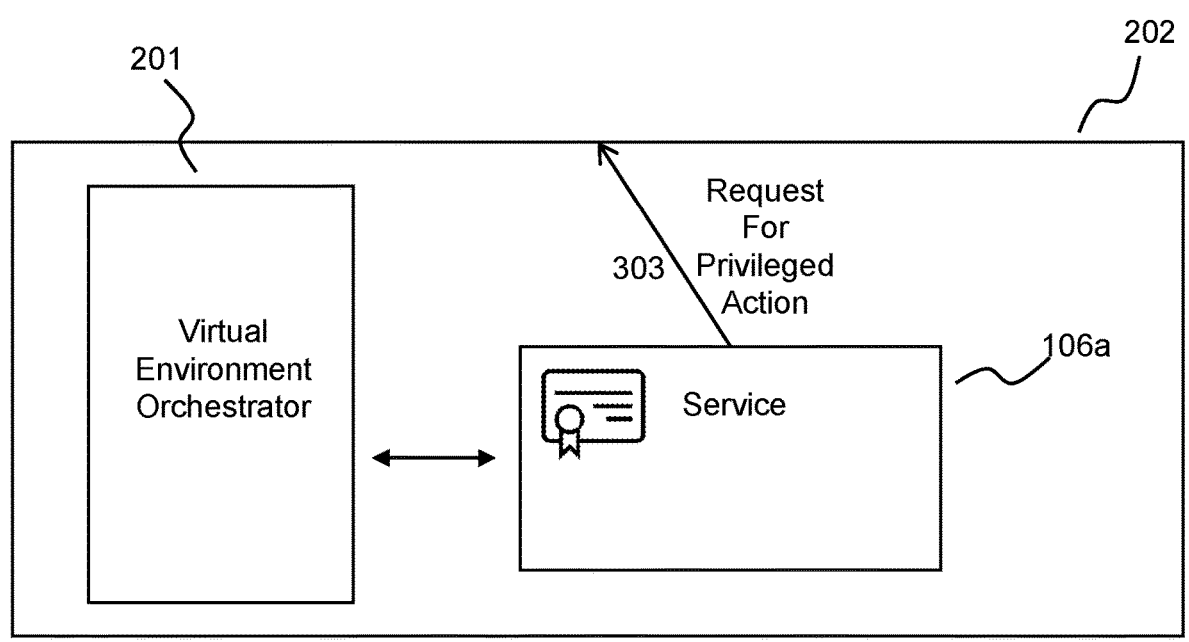

FIG. 3C illustrates an exemplary system 300C where computing resource 106a makes a request in operation 303 to perform a privileged action. With reference to FIGS. 1 and 2, for example, this may involve computing resource 106a requesting access to another of the software-based services 106b-n, which may be an application, agent, software-based device, or virtualized computing instance. If the target software-based service 106b-n has a secure-access limitation (e.g., an authentication requirement, an authorization requirement, etc.), the computing resource 106a's access to it may be considered privileged. In further embodiments, computing resource 106a may be seeking to access an access-restricted external resource, such as server 103a, IoT device 103b, or computer 103c. Likewise, if these external resources have an access limitation (e.g., authentication or authorization restrictions), computing resource 106a's access to them may be considered privileged. Further, in some embodiments, all external access requests by computing resource 106a may be considered privileged by default, or stated differently, all such access requests may involve an authentication or authorization requirement. This may occur, for example, in situations where some or all of software-based services 106a-n are configured (e.g., by virtual environment orchestrator 201) to require themselves to undergo an authentication or authorization process before externally connecting to other resources.

In some embodiments, the request in operation 303 from computing resource 106a is made directly from computing resource 106a to the target resource it is seeking access to. In other embodiments, the request in operation 303 may be intercepted based on target address information it includes. For example, virtual environment orchestrator 201 or router/firewall 105 may be configured to intercept requests from computing resource 106a that involve privileged access to target resources. This intercepting may only occur for certain target resources that are sensitive or access-protected, or may occur for all requests by computing resource 106a (e.g., as a default setting). In embodiments involving this type of intercepting, virtual environment orchestrator 201 or router/firewall 105 may then forward the intercepted request, from operation 303, to security server 101 or credentials vault 102.

Figure 3D:
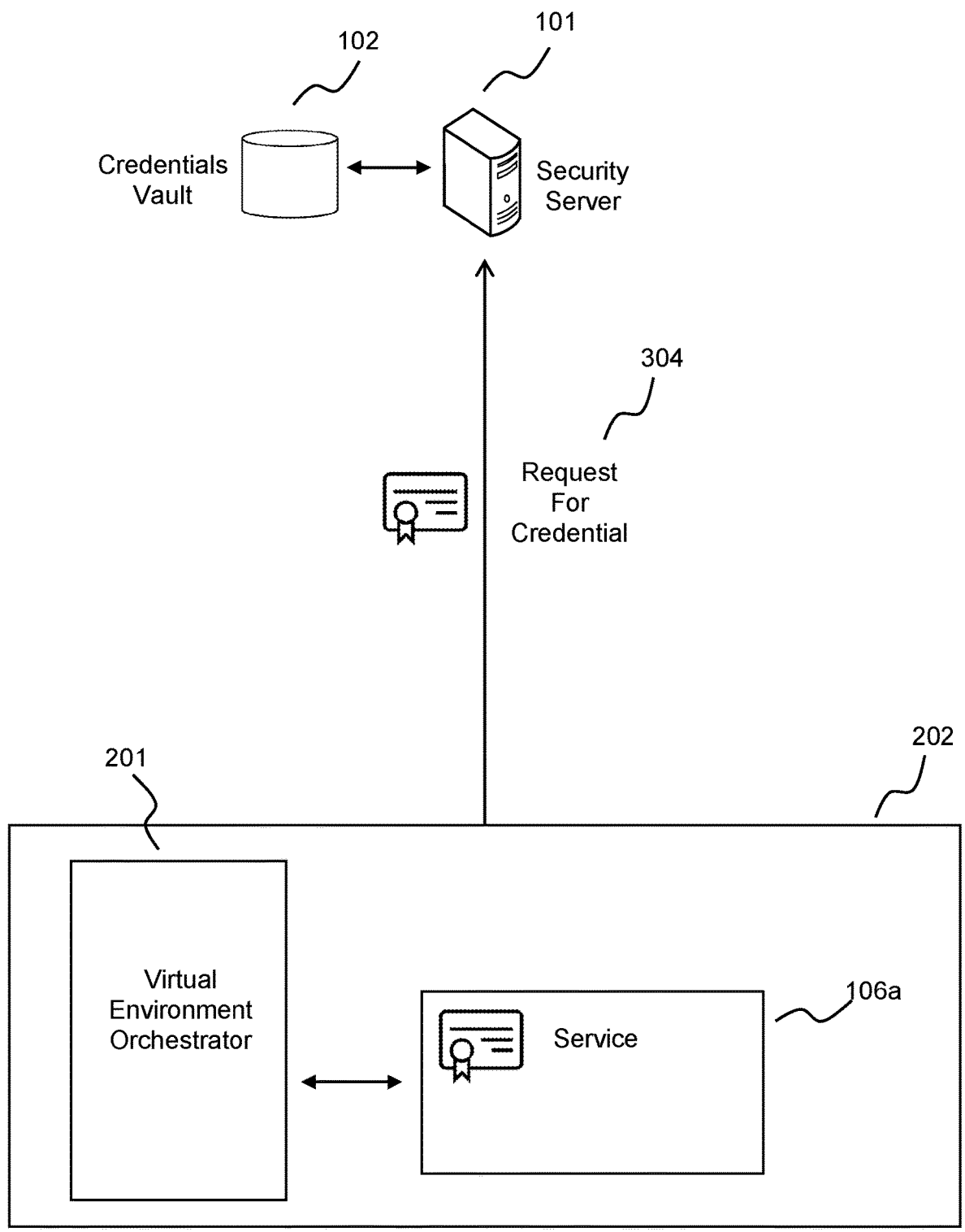
FIG. 3D is an illustration of an exemplary technique for a computing resource requesting a privileged access credential, in accordance with disclosed embodiments.

FIG. 3D illustrates an exemplary system 300D where a computing resource 106a requests a privileged access credential in operation 304. For example, in embodiments where computing resource 106a is seeking to access another resource that has an authentication or authorization requirement, a privileged access credential may be needed for such access. Accordingly, computing resource 106a may need to retrieve such a credential in operation 304 from security server 101 or credentials vault 102. As discussed above, credentials vault 102 (which may be part of security server 101, or separate) may maintain privileged access credentials that permit access to particular resources, such as software-based services 106b-n, servers 103a, IoT devices 103b, computers 103c, and more. In some embodiments, credentials vault 102 may periodically, or according to a security policy, rotate and update the credentials that it stores for such access. For example, if a particular credential is determined to have been compromised or used in an attack, it may be rotated and replaced with a new credential.

In some embodiments, the request in operation 304 may come directly from computing resource 106a itself. Such a request may include the network address information (e.g., IP address, port number, etc.) of computing resource 106a. In further embodiments, the request in operation 304 may be made by virtual environment orchestrator 201 on behalf of computing resource 106a. In such embodiments, the request by virtual environment orchestrator 201 may be configured to likewise include the network address information of computing resource 106a.

The request in operation 304 may include identifying information of the target resource to which computing resource 106a is seeking access. For example, the request in operation 304 may include an IP address, MAC address, network resource name, account name, unique identifier, or other identifying information associated with the target resource. This information may then be used by security server 101 or credentials vault 102 to identify an appropriate credential or token for the requested access. For example, security server 101 and/or credentials vault 102 may maintain lists, tables, or databases linking particular privileged access credentials or tokens to particular target network resources. Upon receiving the request in operation 304, the security server 101 and/or credentials vault 102 may access the lists, tables, or databases to retrieve the appropriate privileged credential or access token.

In accordance with operation 304, the computing resource 106a may send its identity data (e.g., certificate as received in operation 301) and its network address data (e.g., IP address and port number) in a single communication, or in separate communications, to security server 101 and/or credentials vault 102. In embodiments where the identity data and network address data and transmitted in separate communications, they may be transmitted in one or multiple different transmission formats. For example, transmission formats may include LAN communications, WAN communications, WLAN communications, cellular communications, SMS or other text communications, or others. Accordingly, in embodiments where the identity data and network address data and transmitted in separate communications, one or multiple of these communications formats may be used, thus providing both multi-factor and multi-band (e.g., out of band) verification of computing resource 106a in accordance with FIG. 3E.

Figure 3E:
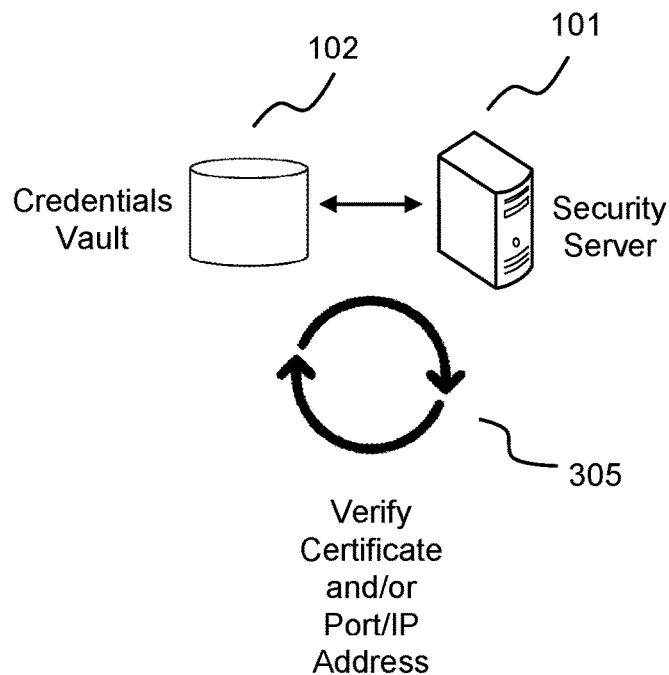
FIG. 3E is an illustration of an exemplary technique for a multi-factor verification of identity data and network address information associated with a computing resource, in accordance with disclosed embodiments.
Figure 3E:
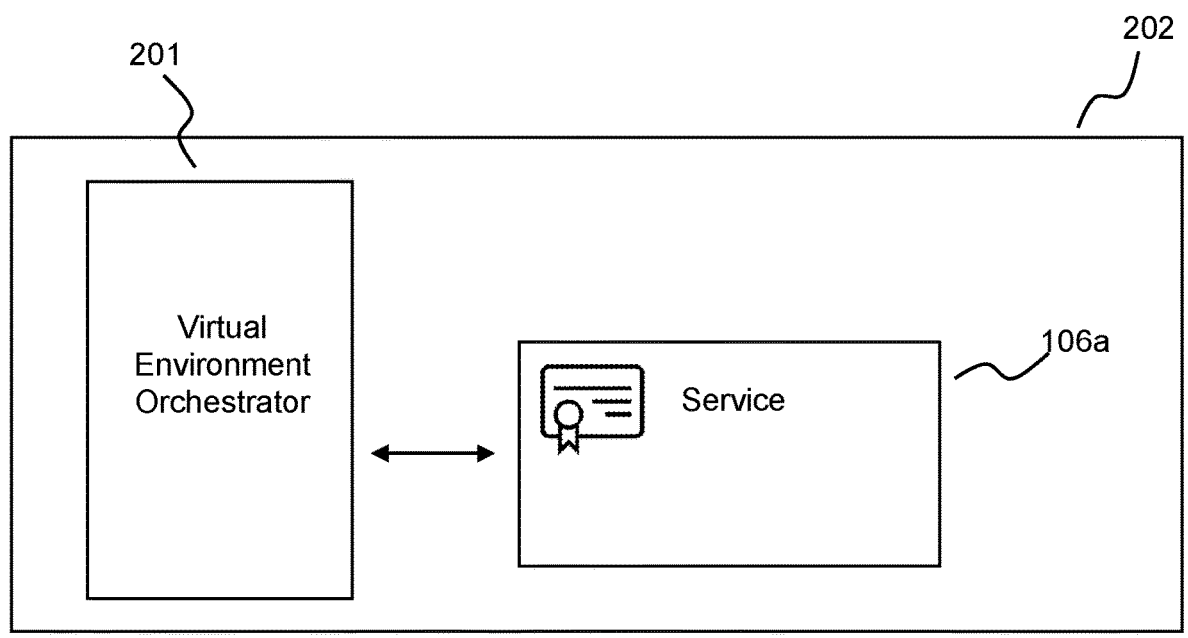

FIG. 3E illustrates an exemplary system 300E for a multi-factor verification of identity data and network address information associated with a computing resource 106a. Consistent with the discussion above, security server 101 and/or credentials vault 102 may have received both the identity data (e.g., certificate as received in operation 301) and its network address data (e.g., IP address and port number) of particular computing resources 106a-n. This data may be stored in tables, lists, or databases at security server 101 and/or credentials vault 102. Accordingly, in operation 305, security server 101 and/or credentials vault 102 may compare the received identity data and the received network address information, and verify whether they match a particular entry in the table, list, or database. That is, if in operation 305 the received identity data is found in the list, table, or database, but the received network address information is not found (or doesn't match the identity data), operation 305 may result in a lack of verifying the computing resource 106a. Similarly, if in operation 305 the received network address information is found in the table, list, or database, but the received identity data is not found (or doesn't match the network address information), operation 305 may result in a lack of verifying the computing resource 106a. On the other hand, if both the identity data and the network address data are found in the table, list, or database, and they are associated with each other (e.g., linked), operation 305 may result in successfully verifying the computing resource 106a.

In some embodiments, operation 305 may additionally include, conditional on a successful verification of the computing resource 106a, retrieving a privileged credential or access token from credentials vault 102. Consistent with the discussion above, if the computing resource 106a is verified in operation 305, a particular privileged credential or access token may be retrieved from credentials vault 102 based on information in the request of operation 303. This may include, for example, a network address (e.g., IP address or MAC address, etc.) of the target resource, a network name or account of the target resource, or another unique identifier of the target resource. Credentials vault 102 may use this information from the request of operation 303 to query a list, table, or database associating such information with particular credentials that may be used to access the target resource. For example, such credentials may be effective to authenticate or authorize the computing resource 106a to access the target resource.

Figure 3F:
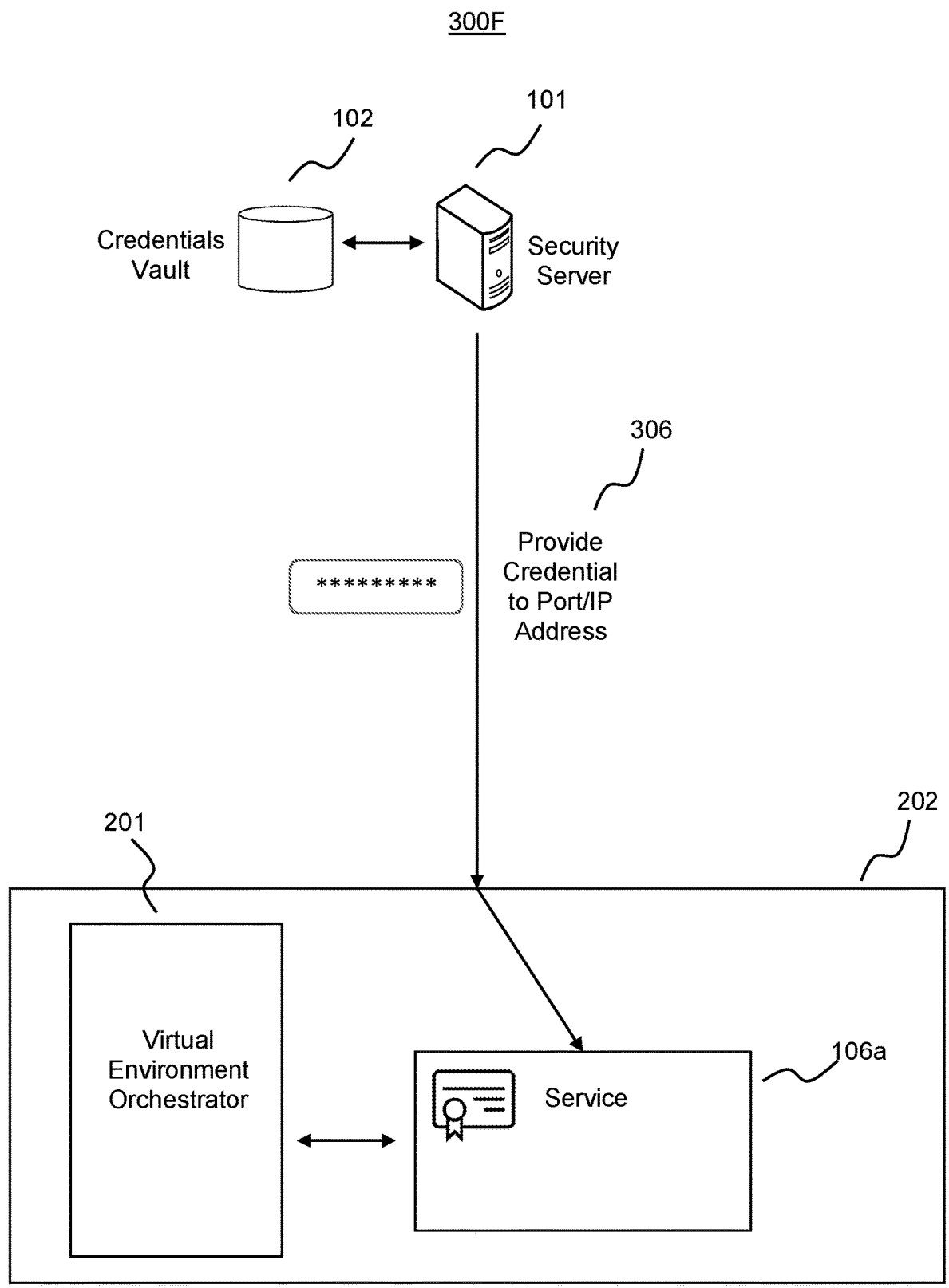
FIG. 3F is an illustration of an exemplary technique for provisioning a credential to a computing resource, in accordance with disclosed embodiments.

FIG. 3F illustrates an exemplary system 300F for provisioning a credential to a computing resource computing resource 106a. As discussed above, the techniques of FIG. 3F may be performed conditional on a successful verification of computing resource 106a in accordance with FIG. 3E. If the computing resource 106a is not successfully verified, operation 306 may not occur.

In operation 306, a privileged access credential (e.g., accessed from credentials vault 102, as discussed above) is provided to, or made available to, computing resource 106a. For example, in some embodiments the privileged credential may be provided directly to computing resource 106a in operation 306. In that situation, computing resource 106a may then use the credential to access the particular access-limited resource it is seeking access to (e.g., based on the request in operation 303). Alternatively, in some embodiments the access token may be made available to a separate resource for use on behalf of computing resource 106a. This may add security to system 300F, since the privileged credential itself may not be stored on, and thus exposed on, computing resource 106a. This technique may include, for example, sending the privileged credential or token in operation 306 to virtual environment orchestrator 201, to router/firewall 105, or to a separate proxy server that is configured to intercept and reroute communications from computing resource 106a. Alternatively, in some embodiments the privileged credential or token may be transmitted from credentials vault 102 directly to the target resource to which the computing resource 106a seeks access (e.g., based on operation 303). In this situation, for example, credentials vault 102 may provide the privileged credential or token to the target resource together with identifying information associated with the computing resource 106a (e.g., the identity data of operation 301, the network address information of operation 302, both, or different identifying data). The target resource may then use the privileged credential or access token for a successful authentication, and may use the received identifying information to permit the computing resource 106a to engage in a secure session with it. In other words, the privileged credential or access token may be used for authentication or authorization at the target resource, and the authentication or authorization will be specific to the computing resource 106a.

Figure 3G:
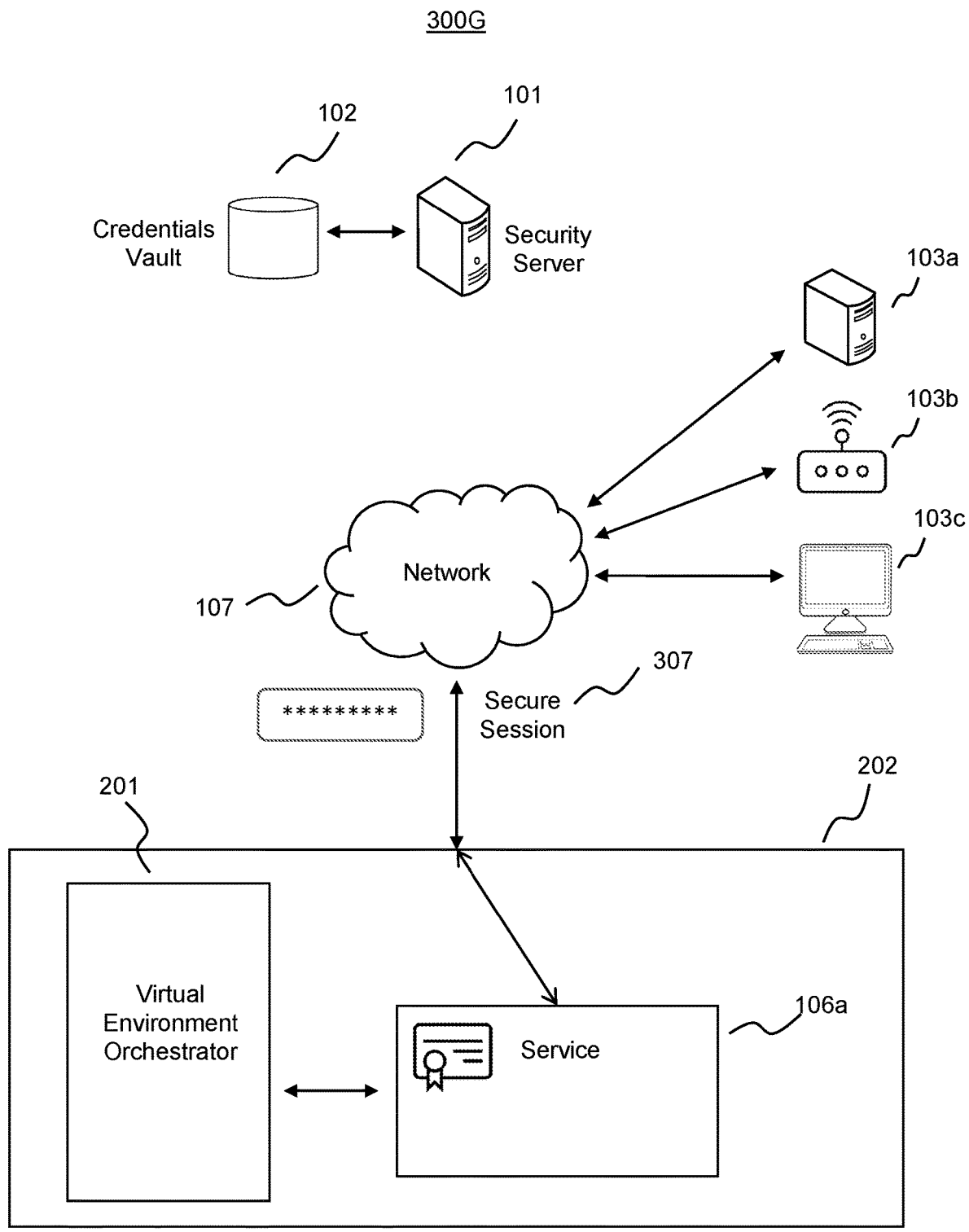
FIG. 3G is an illustration of an exemplary technique for a computing resource to engage in a secure session with an access-protected network resource using a provisioned credential, in accordance with disclosed embodiments.

FIG. 3G illustrates an exemplary system 300G for a computing resource 106a to engage in a secure session with an access-protected network resource using a provisioned credential. As discussed above, the privileged credential or access token may be retrieved from credentials vault 102, and be provided directly to computing resource 106a or to a separate resource (e.g., virtual environment orchestrator 201, router/firewall 105, a proxy server, etc.) on behalf of computing resource 106a. In this situation, computing resource 106a (or another resource, on its behalf) may then use the privileged credential or access token to engage in a secure session 307 with a target resource (e.g., resource identified in operation 303). The particular target resource that is part of the secure session 307 may be, for example, another of software-based services 106a-n or 203a-n, server 103a, IoT device 103b, computer 103c, or another target resource.

In some embodiments, the particular privileged access credential used in secure session 307 may be a limited-use credential or a one-time-use credential valid only for a single session. In such embodiments, credentials vault 102 may rotate or update the credentials it stores at the end of a session. For example, at the end of session 307, virtual environment orchestrator 201 or computing resource 106a itself may send a notification to security server 101 or credentials vault 102 confirming that the session has ended. Credentials value 102 may then rotate the credential that was used in secure session 307 to a new credential. Thus, any attempted reuse of the credential used in secure session 307 would be invalid and unable to achieve authentication or authorization at the particular target resource.

Figure 4:
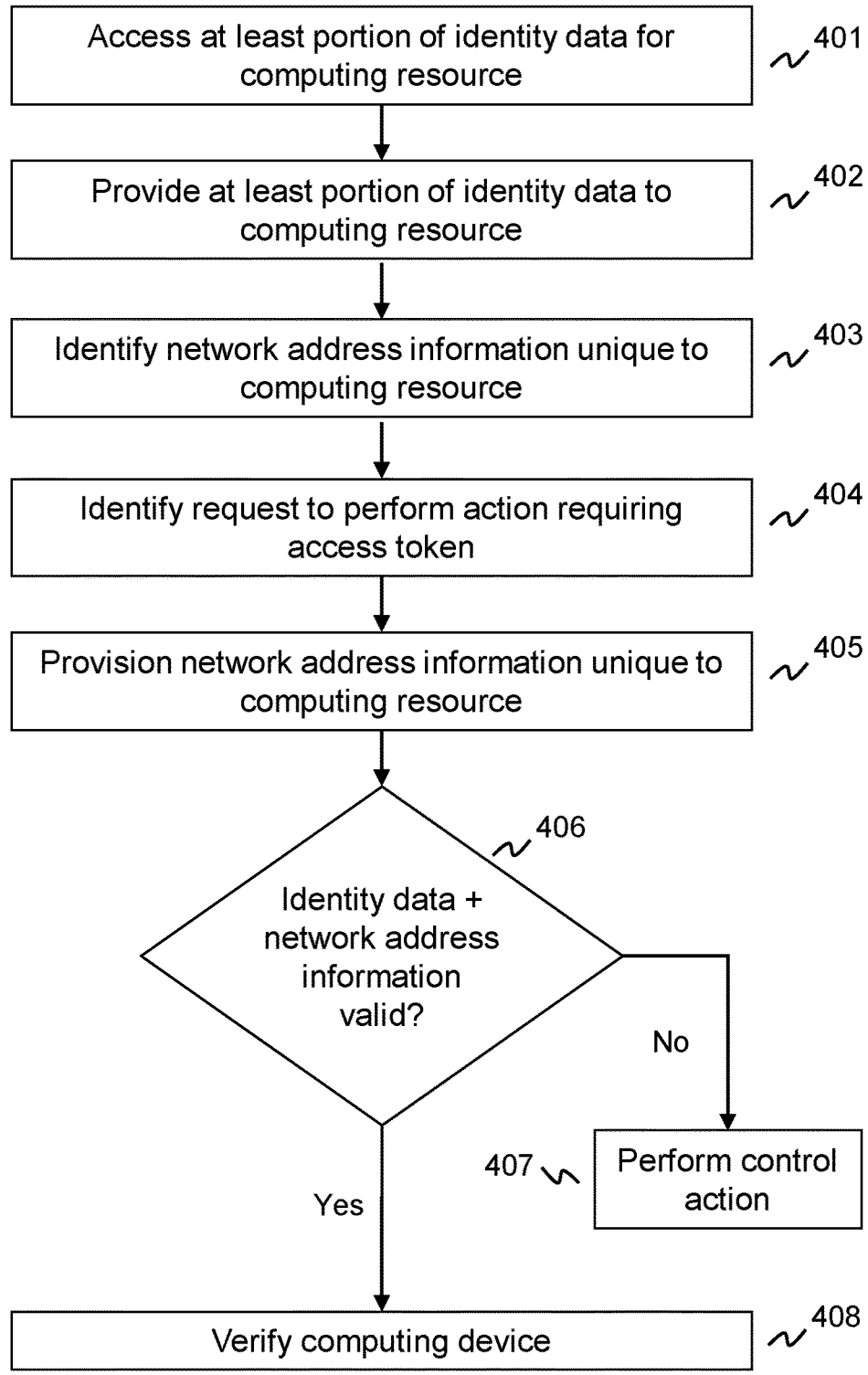
FIG. 4 is a flowchart illustrating an exemplary process for implementing secure and multi-factor authentication for computing resources, in accordance with disclosed embodiments.

FIG. 4 illustrates an exemplary process 400 for implementing secure and multi-factor authentication for computing resources. In accordance with the above discussion, process 400 may be implemented at, for example, security server 101 (which may include, or access, credentials vault 102). Alternatively, process 400 may be implemented by router/firewall 105 or by virtual environment orchestrator 201.

In operation 401, process 400 may include accessing at least one portion of identity data for a computing resource 106a. For example, as discussed above, a portion of identity data may be a user account name or identifier (e.g., Microsoft™ Linux, or other account name or identifier), an application account name or identifier, a digital certificate (e.g., SSL certificate, X.509 certificate, etc.), a token containing unique data, or other types of identifying data. As discussed above, this type of data may be uniquely associated with the particular computing resource 106a, and may represent something that the computing resource 106a "has" or "knows" as a matter of multi-factor authentication.

The identity data may be accessed in operation 401 in a variety of ways. For example, the identity data may be generated dynamically at security server 101 or credentials vault 102. The identity data may be generated in response to an identification from router/firewall 105 or virtual environment orchestrator 201 that the computing resource 106a has been spun up or newly identified. Further, in some embodiments the identity data may already be created, and operation 401 may include accessing the identity data from storage (e.g., a list, table, or database maintained at security server 101 or credentials value 102). Consistent with the discussion above, the identity data may constitute only a portion of identity data that is sufficient to verify the computing resource 106a. As discussed, the verification of computing resource 106a may be based on such identity data as well as network address information uniquely associated with computing resource 106a.

In operation 402, process 400 may include providing the at least one portion of the identity data to the computing resource. For example, as discussed in connection with FIG. 3A, the identity data may be transmitted from security server 101 (or credentials vault 102) to on-premises network 104 or virtual computing network 202. The identity data may be received at router/firewall 105 and routed to computing resource 106a, or may be send directly (e.g., via a secure tunnel connection) to computing resource 106a. Further, the identity data may be received at virtual environment orchestrator 201, or may be transmitted directly to computing resource 106a (e.g., with or without a virtual environment router or firewall as part of network 202). Once computing resource 106a receives the identity data, it may store the identity data (e.g., in local physical storage, or virtually allocated storage in the case of virtualized network 202), for later access.

In operation 403, process 400 may include identifying network address information unique to the computing resource 106a. For example, with reference to FIG. 1, router/firewall 105 may provide or forward such network address information (e.g., IP address and port number for computing resource 106a) to security server 101 or credentials vault 202. Similarly, virtual environment orchestrator 201 may provide such network address information to security server 101 or credentials vault 102. This network address information may be provided in a variety of ways. For example, it may be provided to security server 101 or credentials vault 102 automatically upon the instantiation of computing resource 106a, upon the subsequent identification of computing resource 106a (e.g., based on a network scan), or as part of computing resource 106a sending a request for access to a particular target resource. In some embodiments, the IP address of computing resource 106a may be unique (e.g., associated only with computing resource 106a) or semi-unique (e.g., associated with a group of computing resources 106a-n in environment 104 or 202). The port number of computing resource 106a, however, may be more unique. For example, while a group of computing resources 106a-n may share the same IP address, their respective port numbers may serve to uniquely identify them against each other. Thus, the combination of IP address and port number may serve to uniquely identify computing resource 106a. In other embodiments, variations on this type of network address information, or different network address information, may be used.

In operation 404, process 400 may include identifying a request, from the computing resource 106a, to perform an action requiring an access token. For example, as described in connection with FIG. 3C, computing resource 106a may request in operation 303 to access another network resource that has an access-limited restriction (e.g., authentication or authorization requirement). In some embodiments, the request from computing resource 106a may be addressed and transmitted to the particular target resource itself. In other embodiments, the request from computing resource 106a may be intercepted (e.g., based on an address field for the particular target resource, or based on any address field outside of computing resource 106a itself). The intercepting may be performed by virtual environment orchestrator 201 or by router/firewall 105, which may then forward the request to security server 101 or credentials vault 102. Further, in some embodiments the intercepting may be performed by a separate proxy server. In other embodiments, the request may be sent directly from computing resource 106*a* to security server 101. For example, computing resource 106*a* may be configured to route (e.g., based on a hooking function, or a prestored address for security server 101) its outbound communications to access-protected resources to security server 101.

In operation 405, process 400 may include provisioning the network address information unique to the computing resource, for use in transmitting the access token to the computing resource. In some embodiments, this may include accessing a table, list, or database maintained by security server 101, and looking up the network address information (e.g., IP address and port number) associated with the computing resource 106*a*. In further embodiments, this may additionally include retrieving the particular access token (e.g., privileged access credential) from vault 102, and sending the access token to the network address information that was looked up. Because the network address information is uniquely associated with computing resource 106*a*, even if an attacker wrongfully gains access to the computing resource 106*a*'s identity data and attempts to use it, the attacker will not receive the access token because it will not have the same network address information of the rightful computing resource 106*a*, to which the access token is sent. Thus, even in situations where computing resource 106*a*'s identity data is stolen, leaked, or otherwise compromised, that identity data, by itself, is insufficient to perform a successful verification.

In particular, in operation 406, process 400 includes verifying both the at least one portion of the identity data and the network address information unique to the computing resource 106*a*. An attacker who steals the portion of identity data, or a simply unauthorized user who obtains the identity data from a leakage of the data on which computing resource 106*a* is built (e.g., a source image for computing resource 106*a*), is thus unable to validate themselves because they will not have the same network address information (e.g., IP address and port number) as the rightful computing resource 106*a*. If the verification in operation 406 is successful, process 400 may continue to operation 408, where a successful verification is confirmed. At that point, computing resource 106*a* may access its requested target resource, as described above in connection with FIG. 3G. Alternatively, if one or both of the identity data and network address information are unsuccessfully verified (e.g., because they cannot be located, or do not match each other), process 400 continues to operation 407 of performing a control action. The control action in operation 407 may include, for example, denying computing resource 106*a* access to the target resource, rotating a credential (e.g., in credentials vault 102) associated with computing resource 106*a*, assigning new network address information (e.g., a new port number) to computing resource 106*a*, performing keystroke logging or recording on computing resource 106*a*, performing activity monitoring or recording on computing resource 106*a*, performing network communications activity monitoring or recording for computing resource 106*a*, or various other control actions.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for implementing secure and multi-factor authentication for computing resources, the operations comprising:

identifying, at a trusted service, network address information unique to a computing resource;

accessing at least one portion of identity data for the computing resource;

providing the at least one portion of the identity data to the computing resource; and provisioning, in response to a request to perform an action requiring an access token, and based on the at least one portion of identity data, the network address information unique to the computing resource, for use in transmitting the access token to the computing resource according to the network address information, wherein the network address information corresponds to a location for transferring the access token;

wherein only the computing resource is configured to assert the at least one portion of identity data and receive at the provisioned network address the access token, and wherein the access token enables the computing resource to access an access-restricted target resource.

2. The non-transitory computer readable medium of claim 1, wherein the identity data comprises the network address information unique to the computing resource and at least one of: a certificate, a token, a password, or a secret.

3. The non-transitory computer readable medium of claim 1, wherein the network address information unique to the computing resource includes an IP address and a port number associated with the computing resource.

4. The non-transitory computer readable medium of claim 3, wherein the port number is dynamically assigned to the computing resource.

5. The non-transitory computer readable medium of claim 1, wherein the network address information unique to the computing resource is obtained from a network router or firewall associated with the computing resource.

6. The non-transitory computer readable medium of claim 1, wherein the operations further comprise, conditional on a verification of the at least one portion of the identity data and the network address information unique to the computing resource being successful, providing a privileged credential to the computing resource.

7. The non-transitory computer readable medium of claim 1, wherein the computing resource is at least one of: a virtual computing instance or an application.

8. The non-transitory computer readable medium of claim 1, wherein provisioning the network address information includes transmitting the network address information to a network router or firewall associated with the computing resource.

9. The non-transitory computer readable medium of claim 1, wherein provisioning the network address information occurs transparently to the computing resource.

10. The non-transitory computer readable medium of claim 1, wherein the at least one portion of the identity data and the network address information are each, by themselves, insufficient to successfully perform a verification of the at least one portion of the identity data and the network address information unique to the computing resource.

11. A computer-implemented method for implementing secure and multi-factor authentication for computing resources, the method comprising:
   identifying, at a trusted service, network address information unique to a computing resource;
   accessing at least one portion of identity data for the computing resource;
   providing the at least one portion of the identity data to the computing resource; and
   provisioning, in response to a request to perform an action requiring an access token, and based on the at least one portion of identity data, the network address information unique to the computing resource, for use in transmitting the access token to the computing resource according to the network address information, wherein the network address information corresponds to a location for transferring the access token;
   wherein only the computing resource is configured to assert its the at least one portion of identity data and receive at the provisioned network address the access token, and wherein the access token enables the computing resource to access an access-restricted target resource.

12. The computer-implemented method of claim 11, wherein the providing of the at least one portion of the identity data occurs during an initialization phase for the computing resource.

13. The computer-implemented method of claim 11, wherein the providing of the at least one portion of the identity data occurs in response to the request.

14. The computer-implemented method of claim 11, wherein identifying the request from the computing resource includes intercepting the request.

15. The computer-implemented method of claim 11, wherein the request is identified by receiving a re-routed version of the request from the computing resource.

16. The computer-implemented method of claim 11, further comprising, conditional on a verification of the at least one portion of the identity data and the network address information unique to the computing resource being successful, providing a privileged credential to the computing resource.

17. The computer-implemented method of claim 16, wherein the privileged credential is supplied from a credentials vault.

18. The computer-implemented method of claim 16, wherein the privileged credential is sufficient to enable the computing resource to engage in secure communications with an access-restricted resource.

19. The computer-implemented method of claim 11, wherein the network address information is obtained from a network router or firewall associated with the computing resource.

20. The computer-implemented method of claim 11, wherein provisioning the network address information occurs transparently to the computing resource.

* * * * *